July 20, 1926.

Re. 16,389

H. H. GARNER

CENTRIFUGAL AIR CLEANER

Original Filed Jan. 8, 1921

INVENTOR:
HERMAN H. GARNER,
By Fal W. Lewis
ATTORNEY.

Reissued July 20, 1926. Re. 16,389

UNITED STATES PATENT OFFICE.

HERMAN H. GARNER, OF POMONA, CALIFORNIA, ASSIGNOR TO VORTOX MANUFACTURING COMPANY, OF POMONA, CALIFORNIA, A CORPORATION.

CENTRIFUGAL AIR CLEANER.

Original No. 1,404,952, dated January 31, 1922, Serial No. 435,906, filed January 8, 1921. Application for reissue filed January 5, 1926. Serial No. 79,492.

My invention relates to air cleaners which are used in connection with internal combustion engines for the purpose of removing dust or dirt from the air before it is admitted to the cylinders of the engine.

The principal object of the invention is to provide an air cleaner by which such dirt can be readily removed.

Further objects and advantages will be made evident hereinafter.

Referring to the drawing which is for illustrative purposes only,

Figure 1:
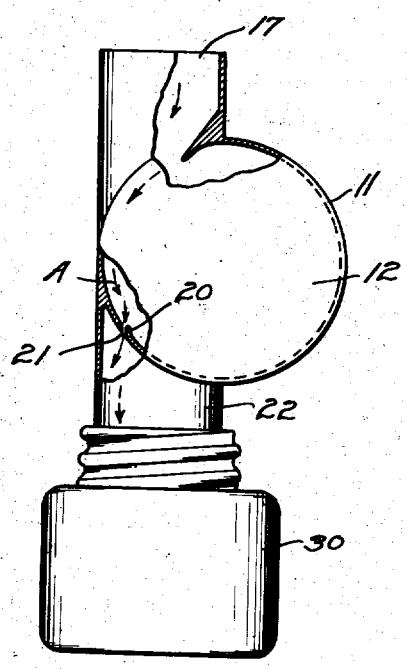
Fig. 1 is an end view of one embodiment of my invention, a portion thereof being broken away to better illustrate the internal structure.
Figure 2:
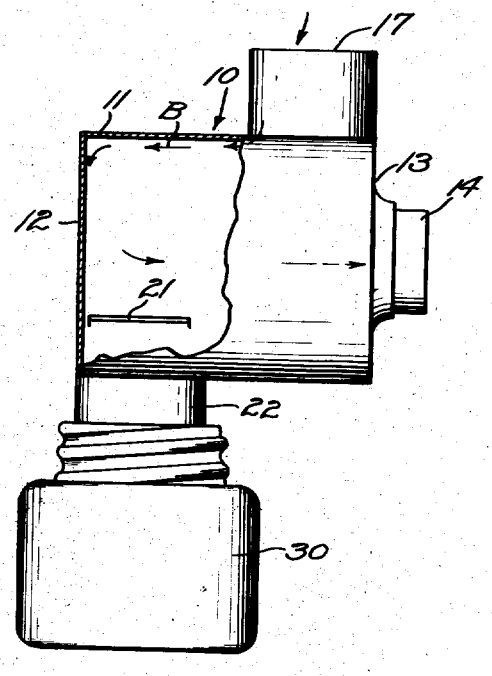
Fig. 2 is a side elevation of same, a portion thereof being broken away to better illustrate the internal structure.
Figure 3:
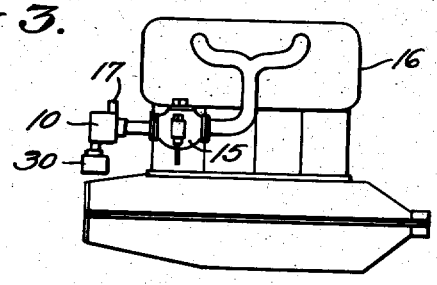
Fig. 3 is a view showing the invention applied to an internal combustion engine.

In the embodiment shown, a cylindrical casing 10 is formed of a shell 11, a bottom 12 and a top 13, the words "top and bottom" being used for identifying purposes only, as the cleaner may be operated with the axis of the shell 11 either vertical or horizontal. The casing may also be conical, spherical or of any form concentric about an axis. Secured in the top 13 is an outlet pipe 14 which communicates with the air intake of the carburetor 15 of an internal combustion engine 16. Opening into the shell near one end thereof is an air inlet pipe 17 which is so formed that the air enters the casing 11 tangentially and is forced to circulate in the direction of the arrow A around the inside of the casing 10. A portion of the wall of the shell 11 is bent inwardly to form a skimmer 20, this skimmer projecting into the interior of the casing 10 near the bottom 12 and leaving an opening 21 in the wall of the casing which communicates through a throat 22 with a dust receptacle 30 which may be in the form of a bottle or jar with a screw top which fits into the throat 22 so that it can be readily removed.

The method of operation of the invention is as follows:

The interior of the shell 11 is placed under a partial vacuum whenever the engine 16 is started due to the suction of the engine which is exerted through the carburetor 15 and the pipe 14. Immediately upon the establishment of this vacuum, the atmospheric pressure of the air outside the casing 11 causes it to rush through the inlet 17 and to set up a whirl or vortex inside the casing 10. The vortex formed inside the casing 10 throws the dirt particles outwardly in the casing so that they whirl about close to the walls thereof in the outer layers of the vortex. In addition to the vortex action, there is a continuous travel of these particles in the direction of the arrow B or towards the bottom 12 away from the top 13. I have studied this movement in the direction of the arrows B in containers having transparent walls and find that it is quite independent of gravity, the particles of dirt being projected upwardly if the shell 11 is so placed that the bottom 12 is on top. This movement is apparently due to an expansion of the air in the outer layers of the vortex. The skimmer 20 projects up sufficiently to constantly cut off a portion of the outer layer of the vortex so that the particles of dust or dirt, as they come around, strike against the skimmer and are thrown down into the dust receptacle 30. The skimmer need not, however, project into the vortex as the dust particles are under considerable centrifugal stress which is exerted against the walls of the shell 11, where an opening like the opening 21 is made in this wall. The dust particles are projected violently through this opening due to this stress. The dust receptacle 30 forms an airtight joint so there is probably no circulation of air through the dust receptacle, the skimmer acting as a dirt deflector. I have found even if the dust receptacle 30 is removed that the apparatus still functions and dirt is still separated, but I find that it operates better if the dust receptacle 30 forms a tight joint with the walls of the casing. Where the receptacle 30 is left off, air is constantly drawn into the casing 10 through the opening 21. The dust particles to escape through the opening 21 must have sufficient momentum to pass out against this inward current of air. By studying the action of such dust particles in a transparent container I have found, if the vortex is properly produced, that the dust particles seem to pass freely through the opening 21 even when air is rushing through the opening under atmospheric pressure. The opening 21 can obviously be placed in the bottom 12 close to the wall of the casing 11. If prevented from escaping through the opening 21 the dust particles will continue indefinitely to travel around in the corner formed by the junction of the casing 11 and the bottom 12. For example, if there be a stream of air flowing inwardly through the opening 21, it may prevent the exit of single dust particles, but there will be an accumulation of such particles gathered from the dusty air entering through the inlet 17 until such time as their combined mass gives them sufficient momentum to overcome the retarding effect of the incoming air and forces them out through it.

I claim as my invention:

1. An air cleaner comprising: a cylindrical casing; a tangential air inlet; a tangential dust outlet in an entirely different zone from said tangential air inlet; a dust chamber into which said tangential dust outlet discharges, said dust chamber being secured in such a manner that it can be readily removed or attached in air-tight relationship to the walls of said casing; and an axial air outlet.

2. An air cleaner comprising: a cylindrical casing; a tangential air inlet directly adjacent to one end of said casing; a tangential dust outlet in an entirely different zone from said tangential air inlet; a dust chamber into which said tangential dust outlet discharges, said dust chamber being secured in such a manner that it can be readily removed or attached in air-tight relationship to the walls of said casing; and an axial air outlet.

3. An air cleaner comprising: a cylindrical casing; a tangential air inlet directly adjacent to one end of said casing; a tangential dust outlet in an entirely different zone from said tangential air inlet directly adjacent to the other end of said casing; a dust chamber into which said tangential dust outlet discharges, said dust chamber being secured in such a manner that it can be readily removed or attached in air-tight relationship to the walls of said casing; and an axial air outlet.

4. An air cleaner comprising: a cylindrical casing; a tangential air inlet directly adjacent to one end of said casing; a tangential dust outlet in an entirely different zone from said tangential air inlet directly adjacent to the other end of said casing; a dust chamber into which said tangential dust outlet discharges, said dust chamber being secured in such a manner that it can be readily removed or attached in air-tight relationship to the walls of said casing; and an axial air outlet opening into the end adjacent to the tangential air inlet.

5. An air cleaner comprising: a cylindrical casing; a tangential air inlet; a tangential dust outlet in an entirely different zone from said tangential air inlet; and an axial air outlet.

6. An air cleaner comprising: a cylindrical casing; a tangential air inlet directly adjacent to one end of said casing; a tangential dust outlet in an entirely different zone from said tangential air inlet; and an axial air outlet.

7. An air cleaner comprising: a cylindrical casing; a tangential air inlet directly adjacent to one end of said casing; a tangential dust outlet in an entirely different zone from said tangential air inlet directly adjacent to the other end of casing; and an axial air outlet.

8. An air cleaner comprising: a cylindrical casing; a tangential air inlet directly adjacent to one end of said casing; a tangential dust outlet in an entirely different zone from said tangential air inlet directly adjacent to the other end of casing; and an axial air outlet opening into the end adjacent to the tangential air inlet.

9. An air cleaner comprising: a cylindrical casing; a tangential air inlet; a tangential dust outlet in an entirely different zone from said tangential air inlet; a dust chamber into which said tangential dust outlet discharges, said dust chamber being secured in air-tight relationship to the walls of said casing; and an axial air outlet.

10. An air cleaner comprising: a cylindrical casing; a tangential air inlet directly adjacent to one end of said casing; a tangential dust outlet in an entirely different zone from said tangential air inlet; a dust chamber into which said tangential dust outlet discharges, said dust chamber being secured in air-tight relationship to the walls of said casing; and an axial air outlet.

11. An air cleaner comprising: a cylindrical casing; a tangential air inlet directly adjacent to one end of said casing; a tangential dust outlet in an entirely different zone from said tangential air inlet directly adjacent to the other end of casing; a dust chamber into which said tangential dust outlet discharges, said dust chamber being secured in air-tight relationship to the walls of said casing; and an axial air outlet.

12. An air cleaner comprising: a cylindrical casing; a tangential air inlet directly adjacent to one end of said casing; a tangential dust outlet in an entirely different zone from said tangential air inlet directly adjacent to the other end of casing; a dust chamber into which said tangential dust outlet discharges, said dust chamber being secured in air-tight relationship to the walls of said casing; and an axial air outlet opening into the end adjacent to the tangential air inlet.

In testimony whereof, I have hereunto set my hand at Los Angeles, Los Angeles County, California, this 23d day of December, 1925.

HERMAN H. GARNER.